US006774914B1

(12) United States Patent
Benayoun

(10) Patent No.: US 6,774,914 B1
(45) Date of Patent: Aug. 10, 2004

(54) NAVIGATION METHOD IN 3D COMPUTER-GENERATED PICTURES BY HYPER 3D NAVIGATOR 3D IMAGE MANIPULATION

(75) Inventor: Maurice Benayoun, Paris (FR)

(73) Assignee: Z.A. Production, Paris (FR)

( * ) Notice: Subject to any disclaimer, the term of this patent is extended or adjusted under 35 U.S.C. 154(b) by 205 days.

(21) Appl. No.: 09/658,940

(22) Filed: Sep. 11, 2000

(30) Foreign Application Priority Data

Jan. 15, 1999 (FR) .............................. 99 00395

(51) Int. Cl.⁷ ................................. G09G 5/00
(52) U.S. Cl. .................. 345/650; 345/653; 345/781; 345/782; 345/851
(58) Field of Search ................. 345/848, 782, 345/851, 653, 650, 419, 976, 850

(56) References Cited

U.S. PATENT DOCUMENTS

| 5,515,486 A | * | 5/1996 | Amro et al. ................. 345/848 |
| 5,602,564 A | * | 2/1997 | Iwamura et al. ............. 345/782 |
| 5,678,015 A | * | 10/1997 | Goh ........................... 345/782 |
| 5,898,435 A | * | 4/1999 | Nagahara et al. ............ 345/841 |
| 6,002,403 A | * | 12/1999 | Sugiyama et al. .......... 345/717 |
| 6,046,749 A | * | 4/2000 | Anderson .................... 345/648 |
| 6,094,237 A | * | 7/2000 | Hashimoto ................... 348/731 |

FOREIGN PATENT DOCUMENTS

EP 0 767 418 A1 * 4/1997 ............ G06F/3/033

* cited by examiner

Primary Examiner—John Cabeca
Assistant Examiner—Namitha Pillai
(74) Attorney, Agent, or Firm—Antonelli, Terry, Stout & Kraus, LLP

(57) ABSTRACT

A method of selecting and displaying an item on a display screen uses a pointing and selecting device including a control button. Displayed, on the screen, are (i) a multifaceted three dimensional object having a fixed center and having at least one side including at least a representative window of a first item to select and display, and (ii) a fixed pointer. The representative window includes a link to the item to be selected and displayed. The three dimensional object is rotated on the screen about the fixed center with respect to three free orthogonal axes, by the manipulation of the pointing device. The representative window of the item to be selected and displayed is superimposed with the displayed pointer at the center of the three dimensional object, for the selection and display on the display screen of the item to be selected and displayed by pushing the control button of the pointing device.

20 Claims, 2 Drawing Sheets

NAVIGATION METHOD IN 3D COMPUTER-GENERATED PICTURES BY HYPER 3D NAVIGATOR 3D IMAGE MANIPULATION

This invention relates to a 3-D computer-generated image navigation process. The field is the manipulation of 3-D images. It is a technical device for selecting a digital file or an audiovisual sequence by the manipulation of a virtual 3-D object.

Conventional computer navigation interfaces function using a flat representation. A 3-D manipulation permits a more rapid access to numerous data having complex and exponential tree structure, and by using an intuitive interface. The present invention requires no navigational dexterity (like a flight simulator).

On the sides of this 3-D volume are displayed images, file addresses, or audiovisual sequences (or representations of them). A pointing device (trackball, mouse, joystick) allows the user to manipulate the 3-D volume, as if handling a cube.

The element to be selected is positioned on the central zone of the graphic or video display screen. The central zone is indicated by highlighting. The selection is confirmed by the click of a button of the pointing device. By clicking, either the following cube, a digital file, text, an image, or a 2-D interface is displayed accordingly.

The present invention is described relative to a cube, but it may also be applied to all 3-D volumes (e.g. a cell phone, a globe, . . . ).

The center of the cube is stationary. The cube may freely rotate on its three axes (X, Y, and Z), but without any translatory movement. The cube is manipulated in real time.

The cube can be turned like the pages of a book.

Industrial Applications:

The 3-D navigator has many uses:

User interface for the Web,

Interactive program guide for television programs,

Multimedia with direct access to a selection,

Exploring the hard disk drive or the secondary storage of a computer,

Interactive presentation terminals,

Interactive menus for electronic apparatus having an integrated display screen,

Interactive operating instructions for any apparatus provided with a view screen (search for the function of a control element for example).

The interface includes 2 interrelated parts:

the three dimensional selection object containing multimedia (for example, a CUBE)

a two dimensional user interface sychronized with the former.

1/The 3-D Part (The Cubes)

The structure is based on a series of concentric cubes. Navigation is achieved through the development and rotation of the cubes. Their common center and the observer's point of view remain fixed.

Reorientation of each cube side is automatic as a function of its rotation providing good legibility of the information (right-reading).

The cube is a way of structuring information.

An Example of Organization:

cube=assembly of themes or directories, side=topic, image or text on a side=subtheme.

Selection is made by using a central, fixed pointer.

When an object (a picture for example) is aligned with the pointer, a title or an new image appears.

Each object has an associated link.

Selection starts the operation (for example: full screen viewing of the image and transition to the 2-D part).

There is a dynamic organization of the contents through the analysis of preferences, work habits, or frequency of access.

Compatibility with all forms of multimedia contents: TV program (HyperTV alternative), Internet (HyperWeb), multimedia network or optical carrier, interactive applications . . .

2/2-D Part (Envelopes)

In opposition to the functioning of window-type interfaces (Windows), the 2-D part of the interface uses the envelopes as the information carrier. All of the envelopes dynamically reorganize themselves to define the display frames of the audiovisual media.

Each element on the screen is an active zone (envelopes, mobile circles).

There is updating of the displayed content, including from data coming from the network.

Subjects are selected by using mobile circles covering icons indicating the nature of the document.

Figure 1:
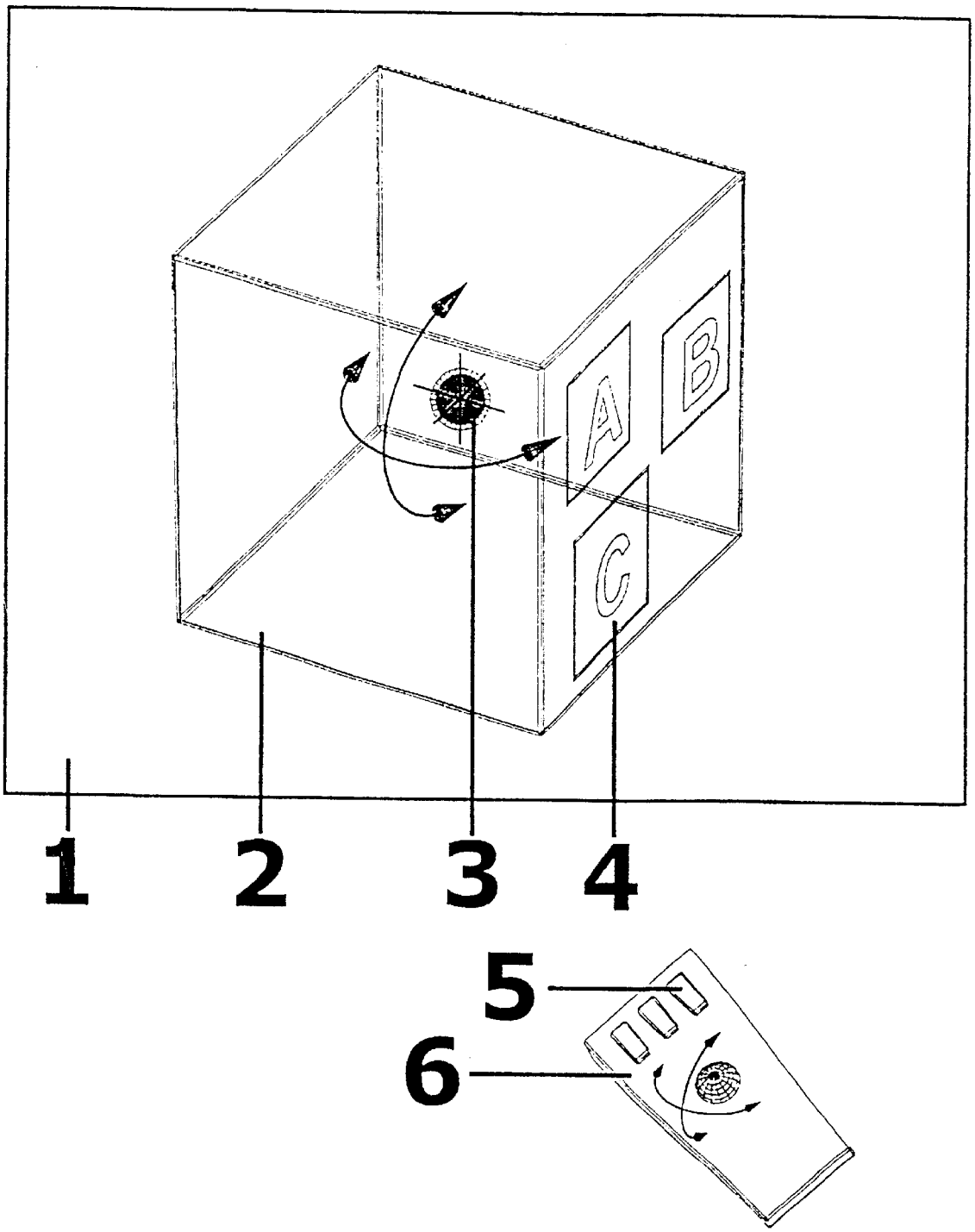
FIG. 1 represents the navigational device.
Figure 2:
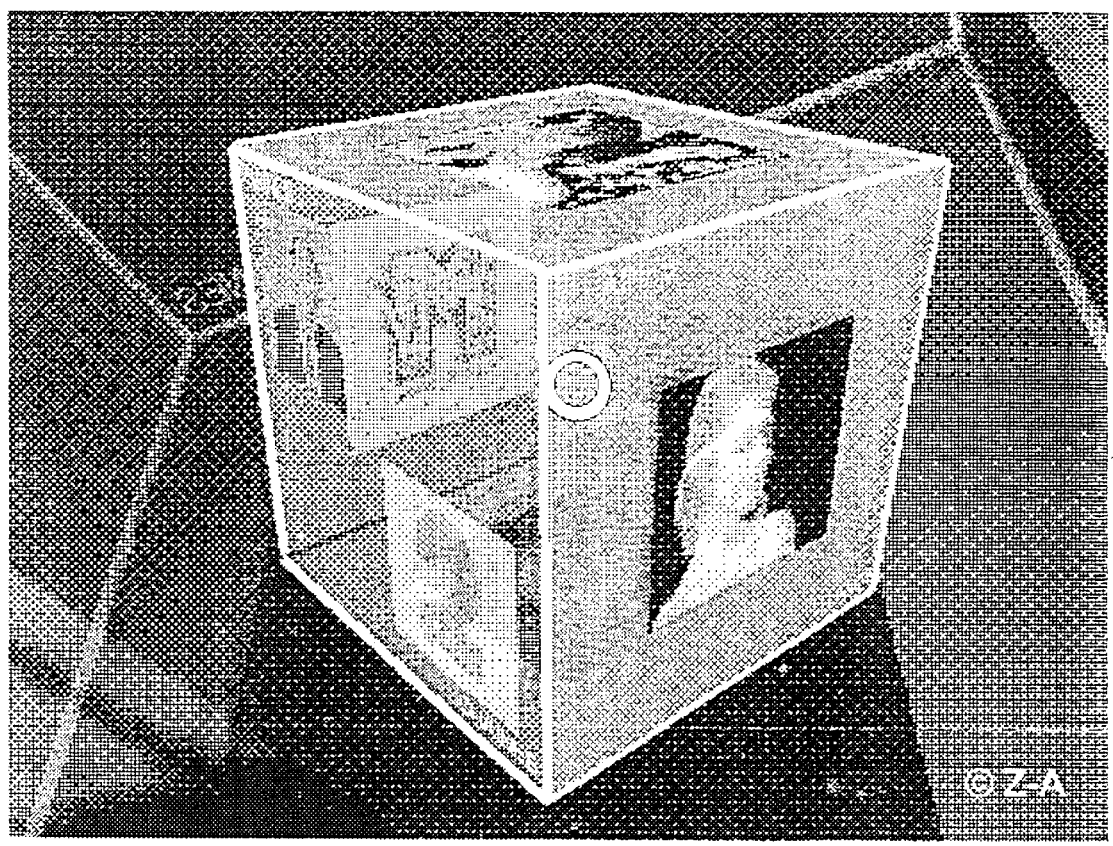
FIG. 2 represents as an example the application of the present 3-D navigator as an "interactive television channel program guide."

According to these drawings, the device has a display screen (1) on which is displayed a 3-D object, a cube (2) to simplify the example. The center of the cube is at the center of the screen. The central zone of the screen is symbolized as a highlighted circle (3). Elements that may be selected (4), are displayed on the sides of the cube (references to digital files, pictures, graphics . . . ). The pointing device (6) (trackball, mouse, joystick) permits the manipulation of the 3-D volume in real time and the display of the selected item at the central highlighting (3). If it is an audiovisual sequence, positioning the selection (4) on the highlighted central zone (3) will activate the animated flow of images. In this case, it is possible to view the film in the window (4) before selecting it.

A click of the control button (5) activates the selection. This gives full screen displaying of a film, an image, or any other digital file. Where there is complex tree structure at several levels, the next cube is reached. The cubes may be concentrically nested and allows extremely rapid navigation.

As an example, cubes displaying 4 items per side contain 24 items to choose from. In 2 successive clicks, 1 item may be chosen from 576. This is an exponential function of the type: 6Xn where "X" is the number of items per side and "n" is the number of levels of tree structure. The sides of the cubes, however, may contain a different number of items to select.

In summary, the present invention relates to a 3-D computer-generated image navigation process characterized by the 3-D volume whose center is fixed and at the center of the display area of the device and symbolized by a graphical marker: "the pointer", volume on the sides of which are the displayed representations of-items to select, "objects", volume capable of being manipulated in real time in its three axes of rotation (without translatory movement) thanks to a pointing device (6) in order to position the selected item on the pointer, a title may eventually be displayed as a preselection phase. The selection is activated by a click on a button of the pointing device (trackball, mouse, joystick). The items to select are represented by a fixed or animated image, a graphical or textual item from a digital file. A link is associated to each item. The observer's view point is fixed.

According to a specific embodiment of the present invention, a selected item on one of the sides of the 3-D volume can provide access to a new concentric 3-D volume which itself has on its sides items to be selected, enabling navigation from volume to volume until the desired level of tree structure is obtained.

According to another embodiment of the present invention, a selected item gives access either to the "flat" display of said item on the screen, or to the opening of a digital data file in a synchronized fashion. The operation may lead to the display of an image, of a full-screen video film, of a Web page, or a multimedia application.

According to a new embodiment of the present invention, a selected item provides access to a new naviagation interface.

According to a new embodiment of the present invention, the organization of displayed items on the sides of the 3-D volume can be dynamically generated from the analysis of the user's preferences.

According to a new embodiment of the present invention, for a simple cube-type 3-D volume, there is access to an automatic reorientation function for each side in relation to its rotation to provide good legibility of information (right-reading).

According to a new embodiment of the present invention, the 3-D navigator can receive content update information from data coming from a network.

According to a new embodiment of the present invention, the 3-D navigator can receive multimedia content streaming information from data received from a network, and use them so as to allow a real time navigation through the different streaming components.

According to a new embodiment of the present invention, a video positioned on the central pointer activates in its selection zone and before its selection with a click.

What is claimed is:

1. A method of selecting and displaying an item on a display screen, using a pointing and selecting device including a control button, comprising:

displaying, on said screen, (i) a multifaceted three dimensional object having a fixed center and having, of which at least one side including at least a representative window of a first item to select and display, said representative window including a link to said item to be selected and displayed, and (ii) a fixed pointer;

rotating the three dimensional object on the screen about the fixed center with respect to three free orthogonal axes, by the manipulation of said pointing device; and superimposing said representative window of said item to be selected and displayed with said displayed pointer at the center of said three dimensional object, for the selection and display on said display screen of said item to be selected and displayed by pushing said control button of said pointing device.

2. A method of selecting and displaying an item according to claim 1, wherein said three dimensional object is a six sided cube.

3. A method of selecting and displaying an item according to claim 1, wherein said at least one representative window is a fixed image, a succession of 35 animated images, a graphical object, or text.

4. A method of selecting and displaying an item according to claim 1, wherein said item to be selected and displayed is a second three dimensional object of the same type as the one in claim 1, and having the same functions as the one in claim 1, at least one side of which includes at least one representative window of a second item to select and display, said representative window including a link with said second item to select and display.

5. A method of selecting and displaying an item according to claim 1, wherein the selection of the item is stored so as to enable electronic determination of the users preferences and to reorganize the representative windows' contents on said three dimensional object with respect to the user's preferences.

6. A method of selecting and displaying an item according to claim 1, wherein one of the said items to select and display is a video file whose images activate only when its representative window is superimposed with the said fixed pointer.

7. A method of selecting and displaying an item according to claim 1, wherein said fixed pointer at the center of the three dimensional object is displayed at the center of the display screen.

8. A selection and display device for the implementation of the selection and display method for an item according to claim 1, comprising:

a display screen; and a pointing and selecting device having a control button enabling the selection and display of said item by superimposing its representative window on the fixed pointer at the center of said three dimensional object.

9. A selection and display device according to claim 6, wherein the pointing device is a mouse, joystick, or trackball.

10. A method of selecting and displaying an item on a display screen, comprising:

displaying, on the display screen, a first multifaceted three dimensional object centered on a displayed pointer, and having a first window representing a first item on one of the multiple facets of the displayed first multifaceted three dimensional object;

entering a first user input to rotate the displayed first multifaceted three dimensional object on the display screen about the displayed pointer to thereby superimpose the first window on the displayed pointer; and with the first window superimposed on the displayed pointer, selecting the first item.

11. The method according to claim 10, wherein the first window includes a link to the first item, and further comprising:

activating the link to the first item, based on the superimposing of the first window on the displayed pointer and prior to selecting the first item, to thereby display the first item on the display screen within the first widow.

12. The method according to claim 10, further comprising:

displaying the first item on the entire display screen, based on the selection of the first item.

13. The method according to claim 10, further comprising:

displaying, on the display screen and based on the selection of the first item, a second multifaceted three dimensional object centered on the displayed pointer, and having a second window representing a second item on one of the multiple facets of the displayed second multifaceted three dimensional object;

entering a second user input to rotate the displayed second multifaceted three dimensional object on the display screen about the displayed pointer with respect to the three orthogonal axes to superimpose the second window on the displayed pointer; and with the second window superimposed on the displayed pointer, selecting the second item.

14. The method according to claim 13, wherein the displayed first multifaceted three dimensional object and the displayed second multifaceted three dimensional object are concentrically nested.

15. The method according to claim 10, wherein the pointer is displayed independent of the display of the first multifaceted three dimensional object and at a fixed location on the display screen.

16. The method according to claim 10, wherein:

the first window is one of multiple windows on the one facet of the displayed first multifaceted three dimensional object; and each of the multiple windows represents one of multiple different items.

17. The method according to claim 10, wherein the first window is superimposed on the displayed pointer from a user point of view.

18. The method according to claim 10, wherein:

the first item is selected by entering a second user input.

19. A system for selecting and displaying an item, comprising:

a monitor, having a display screen, for displaying a first multifaceted three dimensional object centered on a displayed pointer and having a first window representing a first item on one of the multiple facets of the displayed first multifaceted three dimensional object; and a user input device for entering (i) a first user input to rotate the displayed first multifaceted three dimensional object on the display screen about the displayed pointer to thereby superimpose, from the point of view of the user, the first window on the displayed pointer, and (ii) with the first window superimposed on the displayed pointer, a second user input to select the first item.

20. The system according to claim 19, wherein:

the monitor displays the first item on the display screen within the first window, based on the superimposing of the first window on the displayed pointer and prior to entering the second user input.

* * * * *